UNITED STATES PATENT OFFICE.

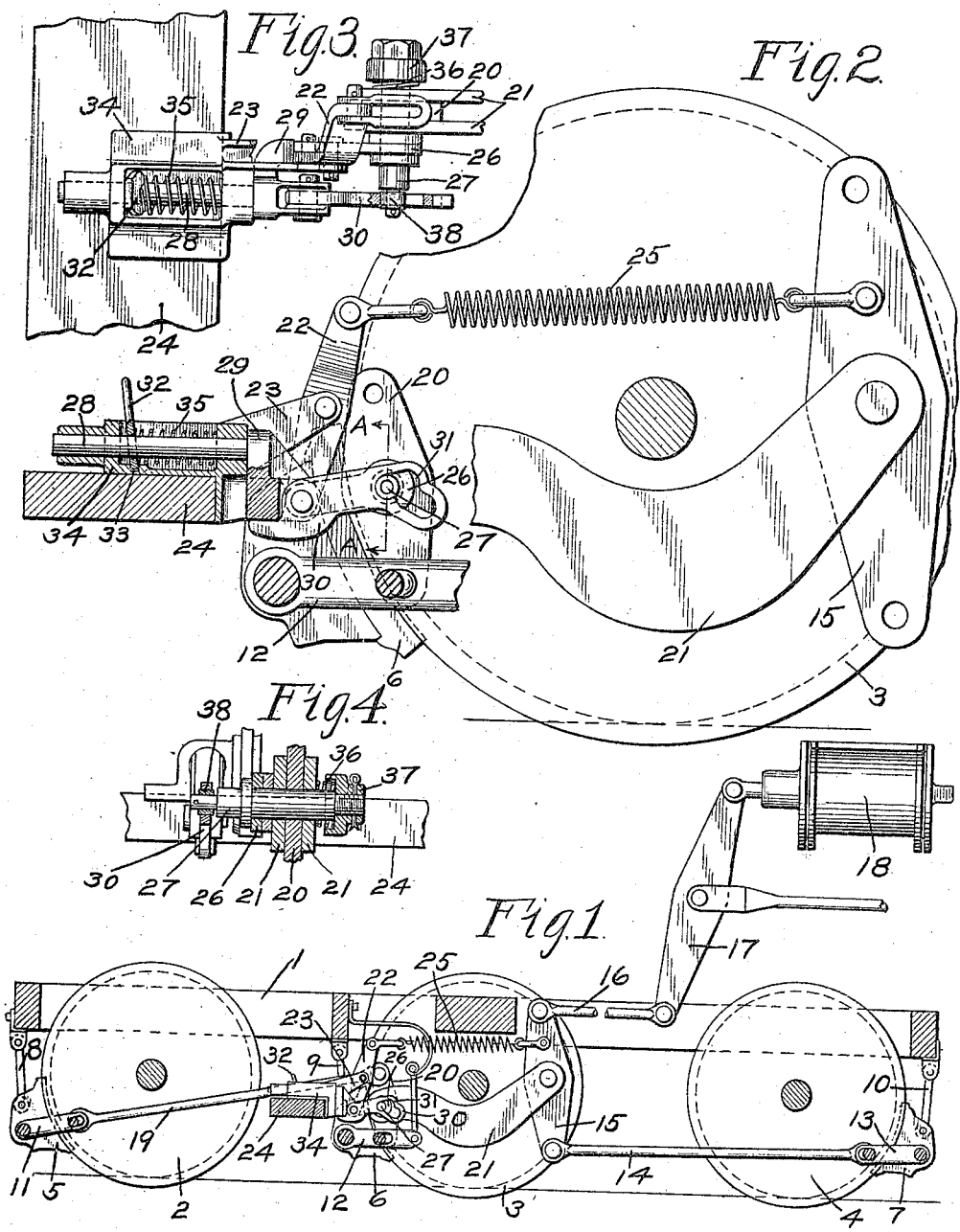

WALTER V. TURNER, OF WILKINSBURG, PENNSYLVANIA, ASSIGNOR TO THE WESTINGHOUSE AIR BRAKE COMPANY, OF WILMERDING, PENNSYLVANIA, A CORPORATION OF PENNSYLVANIA.

BRAKE-RIGGING RELEASE DEVICE.

1,307,165.     Specification of Letters Patent.     Patented June 17, 1919.

Application filed February 27, 1917. Serial No. 151,333.

*To all whom it may concern:*

Be it known that I, WALTER V. TURNER, a citizen of the United States, residing at Wilkinsburg, in the county of Allegheny and State of Pennsylvania, have invented new and useful Improvements in Brake-Rigging Release Devices, of which the following is a specification.

This invention relates to brake rigging as employed on railway vehicles.

It is highly desirable that the brake shoes ride free of the wheels when the brakes are released particularly where the train is in motion and for this purpose springs are usually provided whch act on the brake shoes and tend to move same away from the wheels.

Due to a number of factors involving the frictional resistance of parts to movement, differences in the resisting power of the several release springs, variations in wear of the brake shoes, and the like, it has been found to be very difficult to prevent some of the brake shoes of a truck from rubbing on the wheels when the brakes are supposed to be fully released, with the result that an unnecessary resistance to the movement of the train is set up, the disadvantages of which are obvious.

The principal object of my invention is to provide means for positively insuring clearance between the brake shoes and the wheels when the brakes are released.

In the accompanying drawing; Figure 1 is a central sectional view of a six wheeled truck and brake rigging therefor and showing my invention applied; Fig. 2 an enlarged sectional view of a portion of the construction shown in Fig. 1, to more clearly illustrate the details of the invention; Fig. 3 a plan view of the adjusting mechanism shown in Fig. 2; and Fig. 4 a fragmentary sectional view on the line A—A of Fig. 2.

In Fig. 1 of the drawing, there is shown a six wheeled truck 1 having wheels 2, 3, and 4 at one side of the truck having corresponding brake shoes 5, 6, and 7, there being a similar set of wheels and brake shoes at the opposite side of the truck.

The brake shoes may be supported by hangers 8, 9, and 10 and the brake shoes for each pair of wheels are carried by the respective brake beams 11, 12, and 13.

The brake beam 13 is pivotally connected by a tie rod 14 to one end of a main truck lever 15 the other end of which is pivotally connected to a tie rod 16 having the usual connection through the brake lever 17 to brake cylinder 18.

The brake beam 11 is connected by a tie rod 19 to one end of a truck lever 20, the other end of which is pivotally connected to brake beam 12 and the main truck lever 15 is connected to the truck lever 20 by links 21.

The construction so far described is one of the usual types of brake rigging for six wheeled trucks and according to my invention there is provided an additional lever 22 centrally fulcrumed on an arm 23 secured to the sand plank 24, said lever having one end pivotally connected to a release spring 25, the other end of said spring being secured to the main truck lever 15. The opposite end of lever 22 is pivotally connected to a link 26 which is mounted on the pivot pin 27 of the lever 20.

In order to limit the release movement of the truck lever 20 a stop device is provided, comprising an adjustable rod 28 carrying a stop 29 adapted to be engaged by the lever 22 in its release movement. The automatic adjustment of the stop device is effected by providing a link 30 having one end pivotally connected to the rod 28 and the opposite end provided with a slot 31 engaging a roller 38 on the pin 27.

A clutch ring 32, fulcrumed at 33 in the casting 34 is apertured to receive the rod 28 and is acted upon by a spring 35, so that the rod 28 may be pulled out, but is prevented from moving rearwardly by the gripping of the clutch ring on the rod.

For a purpose to appear hereafter, the rotative movement of the lever 20 is opposed by a frictional resistance and for this purpose a spring 36 is provided which surrounds the pin 27 and is held under compression against one of the links 21 by a nut 37.

In operation, the brake shoes are preferably adjusted, so that each shoe has an equal clearance with respect to the wheel when the brakes are in release position.

When the brakes are applied the brake shoes are brought into engagement with the wheels in the usual manner, the truck lever 20 being pulled toward the right by the links 21 to apply the brake shoes 5 and 6. This movement of lever 20 also pulls the lower end of lever 22 through the link 26, so that the spring 25 is stretched.

Under normal conditions, the link 30 is not moved in applying the brakes, since the pin 27 merely works rearwardly in the slot 31.

Upon releasing the brakes, the tension of the release spring 25 is directly exerted on lever 22 to effect the release movement of the brake beams 11 and 12 through the action of link 26 on the lever 20. By reason of the frictional resistance of the lever 20 to rotative movement, the lever 20 tends to retain its angular position due to the engagement of the brake shoes on the wheels and thus cause a parallel and equal movement of the brake shoes 5 and 6 away from the wheels. When the shoe clearance equals the adjusted amount, the lever 22 will engage the stop 29 and thereby prevent further release movement of the brake beams 11 and 12. Further movement of the parts to release position causes the positive release movement of the brake beam 13, since the links 21 now act as a fulcrum for lever 15, so that the release spring 25 acts directly on said lever to move the brake beam 13 in the direction to release the brake shoes 7.

It will now be seen that by the above described construction, the brake beams 11 and 12 can not fail to move to release position, but by providing the limiting stop device, this movement is limited, so that the release movement of the brake beam 13 to provide shoe clearance is also assured.

As the brake shoes wear, the slack is taken up in the usual manner by the operation of the slack adjuster, but since this operation changes the relative position of the brake beams with respect to the wheels, it will be evident that the stop 29 should be moved forward in order to compensate for the slack adjustment.

In order to effect the adjustment of the stop 29 the operation is as follows; when the movement of the brake beam 12 toward the wheels exceeds the amount of movement permitted by the slot 31, the pin 27 will engage the outer end of the link 30 and thus pull out the rod 28 in accordance with the excess movement of the brake beam, the adjusted position of the rod 28 being maintained by the clutching of the ring 32 on the rod. It will now be seen that the stop 29 is automatically adjusted as the brake shoes wear, so as to limit the release movement of the brake beams 11 and 12 and thus prevent the shoe clearance from exceeding a predetermined amount.

In order to prevent a false adjustment of the stop 29 by a possible dragging movement of the brake shoes around the wheels, the slot 31 is provided with a downwardly extended portion into which the pin 27 will move in case the brake shoe moves downwardly.

While shown in the drawings as applied to a six wheeled truck, my invention may also be applied in connection with a four wheeled truck.

Having now described my invention, what I claim as new and desire to secure by Letters Patent, is:

1. In a brake rigging for a plurality of pairs of wheels, the combination with operatively connected brake shoes applied to each pair of wheels, of a single stop for limiting the release movement of the brake shoes for two pairs of wheels and for defining a fulcrum point for effecting the release movement of the brake shoes for another pair of wheels.

2. In a brake rigging for a six wheeled truck, the combination with brake shoes for each pair of wheels and a lever operatively connecting the brake shoes of two adjacent pairs of wheels, of a stop for limiting the release movement of said lever and the connected brake shoes.

3. In a brake rigging for a six wheeled truck, the combination with brake shoes for each pair of wheels and a lever operatively connecting the brake shoes of two adjacent pairs of wheels, of a stop for limiting the release movement of said lever and the connected brake shoes, and adapted to determine a fulcrum point to effect the release movement of the brake shoes for the other pair of wheels.

4. In a brake rigging for a six wheeled truck, the combination with brake shoes for each pair of wheels, a lever operatively connecting the brake shoes of two adjacent pairs of wheels, and a lever operatively connected to the brake shoes for the other pair of wheels, of a release spring operatively connecting said levers.

5. In a brake rigging for a six wheeled truck, the combination with brake shoes for each pair of wheels, a lever operatively connecting the brake shoes of two adjacent pairs of wheels, and a lever operatively connected to the brake shoes for the other pair of wheels, of a release spring connected to one lever and a lever mechanism for connecting the spring to the other lever.

6. In a brake rigging for a six wheeled truck, the combination with brake shoes for each pair of wheels, the brake shoes of one pair of wheels being adapted to move in a direction opposite to the other brake shoes in applying and releasing the brakes, of a release spring tending to move all the brake shoes in the same direction in releasing and a stop for limiting the movement of the brake shoes for two pairs of wheels.

7. In a brake rigging for a six wheeled truck, the combination with brake shoes for each pair of wheels, a release spring operatively connected to the brake rigging for moving the brake shoes of two pairs of wheels to release the brakes, a stop for limiting said movement, and a lever connected with the brake shoes of the other pair of wheels, through which the release spring acts to release said brake shoes upon engagement of the brake rigging with said stop.

8. In a brake rigging for a six wheeled truck, the combination with brake shoes for each pair of wheels, a floating lever connecting the brake shoes of two pairs of wheels, and a floating lever connected to the first lever for operating the brake shoes of the other pair of wheels in the opposite direction, of a fulcrumed lever connected to the first floating lever and a release spring connecting the fulcrumed lever with the other floating lever.

9. In a brake rigging for a six wheeled truck, the combination with brake shoes for each pair of wheels, a floating lever connecting the brake shoes of two pairs of wheels, and a floating lever connected to the first lever for operating the brake shoes of the other pair of wheels in the opposite direction, of a fulcrumed lever connected to the first floating lever, a release spring connecting the fulcrumed lever with the other floating lever, and a stop device for limiting the release movement of the first floating lever.

10. In a brake rigging, the combination with brake shoes for two pairs of wheels, of a pivoted lever connecting said brake shoes and means for opposing the rotative movement of said lever during the release movement of said lever.

11. In a brake rigging, the combination with brake shoes for two pairs of wheels operating in the same direction, of a pivoted lever operatively connecting said brake shoes and means for opposing the rotative movement of said lever in the release movement of said lever.

12. In a brake rigging, the combination with brake shoes for two pairs of wheels operating in the same direction, of a pivoted lever operatively connecting said brake shoes and means for frictionally resisting the rotative movement of said lever throughout the release movement of said lever.

In testimony whereof I hereunto set my hand.

WALTER V. TURNER.

Copies of this patent may be obtained for five cents each, by addressing the "Commissioner of Patents, Washington, D. C."